(12) United States Patent
Chen

(10) Patent No.: US 6,718,220 B2
(45) Date of Patent: Apr. 6, 2004

(54) METHOD AND SYSTEM OF MONITORING APPARATUSES OF MANUFACTURING IC

(75) Inventor: Chung-Hsin Chen, Hsinchu (TW)

(73) Assignee: Windbond Electronics Corporation, Hsinchu (TW)

( * ) Notice: Subject to any disclaimer, the term of this patent is extended or adjusted under 35 U.S.C. 154(b) by 47 days.

(21) Appl. No.: 09/995,645

(22) Filed: Nov. 29, 2001

(65) Prior Publication Data

US 2003/0100970 A1 May 29, 2003

(51) Int. Cl.[7] .............................................. G06F 19/00
(52) U.S. Cl. ..................... 700/108; 700/121; 702/182
(58) Field of Search ............................... 700/108, 109, 700/110, 111, 121, 117; 702/182–184

(56) References Cited

U.S. PATENT DOCUMENTS 6,240,329 B1 * 5/2001 Sun ............................ 700/110
2002/0123816 A1 * 9/2002 Tanaka et al. ............... 700/108
2002/0143421 A1 * 10/2002 Wetzer ........................ 700/100
2002/0147518 A1 * 10/2002 Nguyen ....................... 700/108
2003/0093174 * 5/2003 Nikulin ....................... 700/121

* cited by examiner

Primary Examiner—Leo Picard
Assistant Examiner—Zoila Cabrera

(57) ABSTRACT

A method and system of monitoring apparatuses of manufacturing integrated circuit (IC) detects the problems during wafers processing by replaying the apparatus events. First, the method and system download the data of apparatus events, and then calculate the achievement indices. Then, the method and system establish the control chart to determined limitative rules, and execute the replaying system by establishing the computer interface system therewith to detect the abnormal point so as to proceed a rectification. The method and system of monitoring apparatuses of manufacturing IC review the past achievements by establishing a model for replaying apparatus history and achievements, and foresee the future problems by establishing control charts and a knowledge archive of rules.

18 Claims, 5 Drawing Sheets

METHOD AND SYSTEM OF MONITORING APPARATUSES OF MANUFACTURING IC

FIELD OF THE INVENTION

The present invention relates to a method and system of monitoring in the factory of manufacturing integrated circuit (IC). More particularly, it is related to a method of monitoring apparatuses of manufacturing IC, and a system of replaying events and responding thereto.

BACKGROUND OF THE INVENTION

In the process of manufacturing IC, in the case of increasing manufacturing quality of wafers, decreasing the production cost, and shortening production cycle, it is important to study the topic of automation manufacturing integrated by management information system (MIS). A complete integrated automation system includes production schedule system, quality management system, monitoring system, and automaton interface system etc. Due to the renovation of IC product and the complexities of the processes of manufacturing IC, the automation system must have a good production schedule system and a sound management system. On the other hand, considering the quality of manufacturing IC, the automation system must further have a quality management and a monitoring system to control the processes.

Referring to FIG. 1, FIG. 1 illustrates the schematic connection diagram of a part of general IC production system. In the single-region production system, the control mainframe 10 connects with production apparatus 12, production apparatus 14 and a plurality of data mainframes 16 by a network. The control mainframe 10 not only controls the actions of production apparatus 12 and production apparatus 14, but also reads the database of data mainframes 16 that store a plurality of operation parameters and information. The data sent from the production apparatus 12 and production apparatus 14 to the control mainframe 10, and the data sent from the control mainframe 10 to the production apparatus 12 and production apparatus 14 can be transformed by using the parameters and information in the database of data mainframes 16.

The general factory monitoring system of manufacturing IC is mainly used to monitor wafers so as to know the structures and conditions of wafers after processing. Only when examining workstations have detected something wrong regarding with the dimensions of wafers after processing, the operators begin to collect the data from data mainframes 16, and then check the problems one by one. The aforementioned monitoring method may take a lot of time and effort, and still may not confirm the problems completely, because the problems are checked artificially.

Besides, the production monitor of prior art controls the produced apparatus mostly by reading the information in the database of data mainframes 16, like event occurring rates of production apparatus and production output. But, the actual process and result of manufacturing IC cannot be understood simply from the aforementioned information. If there is any problem in the actual process of manufacturing wafers, the problems are often not disclosed. When the problems happen again, the problems more or less would cause damages.

SUMMARY OF THE INVENTION

In the aforementioned system of prior art, there is no suitable method and system of monitoring apparatuses. Hence, the present invention provides a method of monitoring apparatuses of manufacturing IC and a system of replaying events and responding thereto.

When lots of wafers are processed in apparatuses, the method of monitoring apparatuses of manufacturing IC of the present invention is used to monitor the full course of apparatus events, the method including: providing a database; downloading data of apparatus events from the database; calculating a plurality of apparatus achievement indices by using the data of apparatus events; establishing a control chart by using the apparatus achievement indices; establishing a knowledge archive of rules by using the data of apparatus events, the apparatus achievement indices, and the control chart, and determining a plurality of limits to detect an abnormal point; forming a calendar file by sorting the apparatus events with time; executing a step of replaying apparatus events to proceed a rectification.

The method of monitoring apparatus of manufacturing IC of the present invention can detect the abnormal points merely by replaying apparatus events, or by self-determined limits, so as to proceed a rectification. The data of apparatus events of the method of monitoring apparatus of manufacturing IC of the present invention include: apparatus status, transferred out accounts, and data of work in process (WIP). The aforementioned apparatus achievement indices include production output (move), productive time (PT), pieces of hour (POH), time of waiting for material (loss time; LT), batch counts (batch), averaged waiting time of WIP (W), and waiting length of WIP (L). In addition, the calendar files include changes of apparatus status, transferred out accounts, and WIP. In the preferred embodiment of the method of monitoring apparatus of manufacturing IC of the present invention, the aforementioned control chart is established by gathering about 60 data in 2 months, and the control limit therein is 3 standard deviations.

On the other hand, the method of monitoring apparatus of manufacturing IC of the present invention is used to monitor production apparatus events, wherein the production apparatuses are used to process lots of wafers. In addition, the system of monitoring apparatus of manufacturing IC of the present invention includes: a control mainframe to control the production apparatuses; a data mainframe, which has a plurality of operating parameters to record the production apparatus events and a plurality of process data; a monitoring mainframe to proceed a process of monitoring apparatuses so as to replay production apparatus events of manufacturing wafers. The aforementioned process of monitoring apparatuses is the method of monitoring apparatus of manufacturing IC of the present invention.

The method and system of monitoring apparatus of manufacturing IC of the present invention is established by reviewing the past achievements and foreseeing the future problems, wherein reviewing the past achievements are aimed by establishing the model of replaying apparatus history and achievements, and foreseeing the future problems are aimed by establishing control charts and a knowledge archive of rules.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
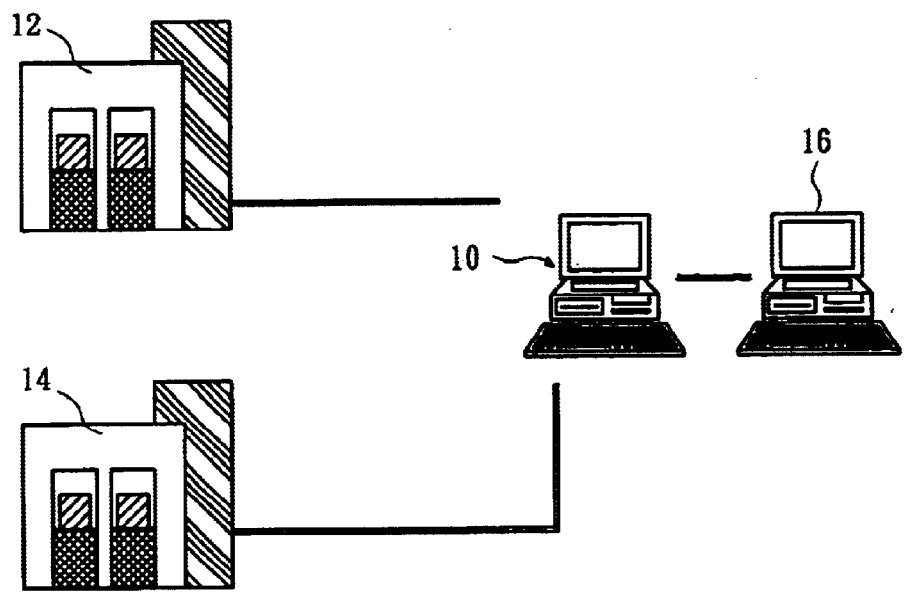
FIG. 1 illustrates the schematic connection diagram of a part of general IC production system.
Figure 2:
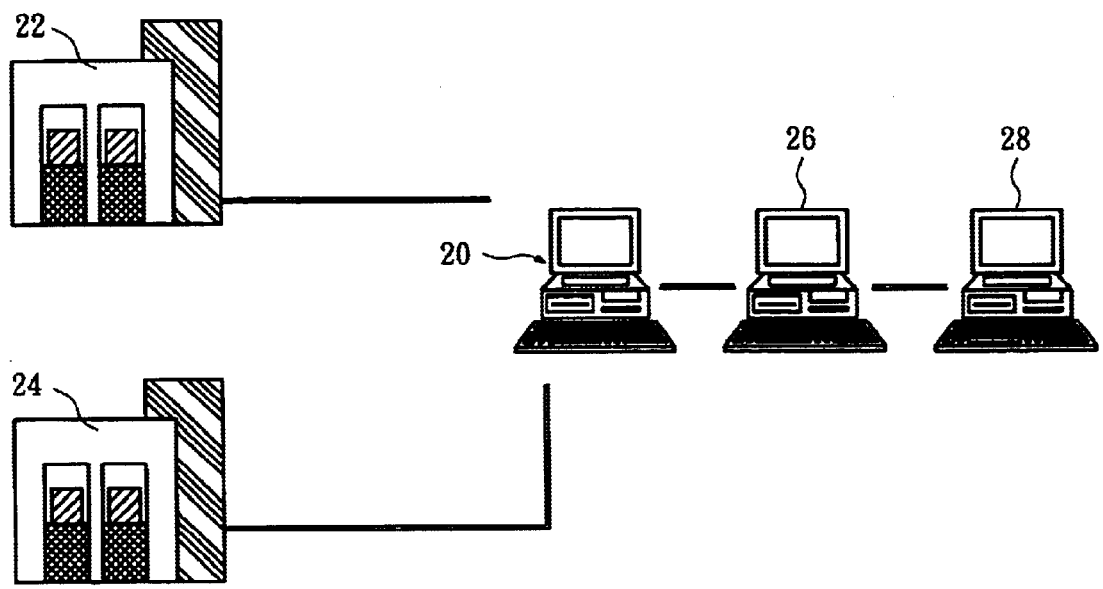
FIG. 2 illustrates the schematic connection diagram of a part of IC production system of the present invention.

The conventional method and system of monitoring wafer production not only wastes time and effort, but also easily cause an error. Due to no suitable method and system of monitoring apparatuses existing, the present invention provides a method and system of monitoring apparatuses so as to know the full course of wafer production by replaying apparatus events, such as shown in FIG. 2. FIG. 2 illustrates the schematic connection diagram of a part of production system of the present invention. In the IC production system, the control mainframe 20 connects with production apparatus 22 and production apparatus 24, and controls their actions, wherein the production apparatus 22 and production apparatus 24 may be in different types with different IC productions. The control mainframe 20 also connects with a plurality of data mainframes 26 by a network, and reads the database of data mainframes 26 that stores a plurality of operation parameters and information. The data sent from the production apparatus 22 and production apparatus 24 to the control mainframe 20, and the data sent from the control mainframe 20 to the production apparatus 22 and production apparatus 24 can be transformed by using the parameters and information stored in the database of data mainframes 26. The method and system of monitoring apparatuses of manufacturing IC of the present invention provide a control mainframe 28, which connect with the data mainframes 26 by a network so as to download the apparatus information in the database of data mainframe 26. The control mainframe 28 establishes another archive by using the apparatus information in the database, and a plurality of parameters and data during processing wafers by apparatuses, in order to form the apparatus achievement indices for processing wafers.

Figure 3:
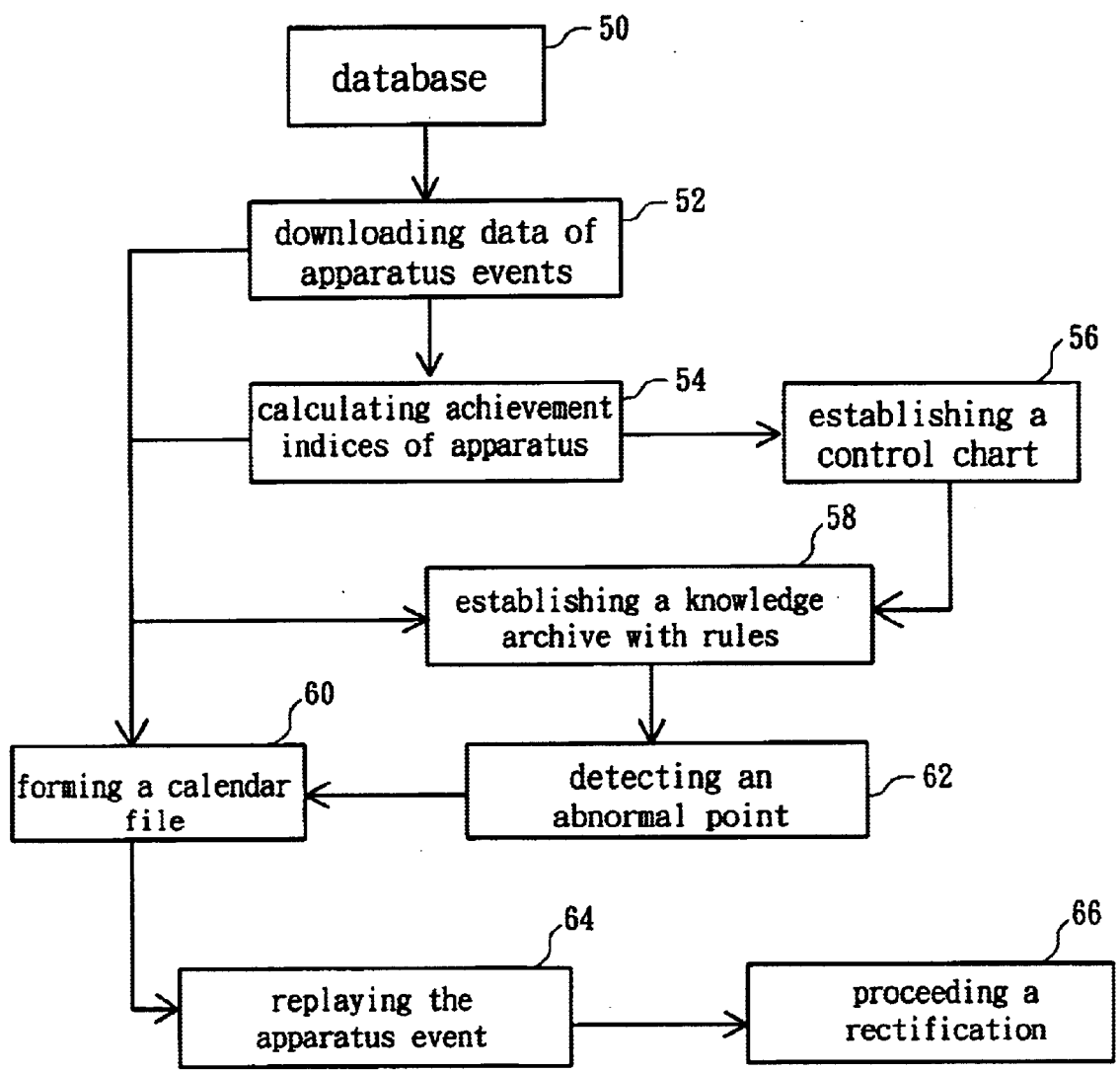
FIG. 3 illustrates the structure of the method and system of monitoring apparatuses of manufacturing IC of the present invention.

FIG. 3 illustrates the structure of the method and system of manufacturing IC of the present invention. Referring to FIG. 3, the method and system of monitoring apparatuses of manufacturing IC of the present invention download data of apparatus event 52 from the database 50, and calculate achievement indices of apparatus 54 by using the data of apparatus event 52. Then, the present invention establishes a control chart 56 by using the apparatus achievement indices and establishes a knowledge archive of rules 58 by using the data of apparatus achievement indices. The step of establishing the knowledge archive of rules 58 sets several limitative rules in the computer database, and then checks data of apparatus event 52 by the control chart 56 to detect hidden problem. For example, the statuses against the limitative rules include:

(1) Status 1: apparatus events are different from the actual conditions of WIP. For example, the apparatus event shows waiting for material, but the apparatus has WIP actually.

(2) Status 2: the achievement indices are over the limit in the control chart.

(3) Status 3: several achievement indices are continuously located at the same side of average line.

(4) Status 4: the achievement indices have established a trend.

(5) Status 5: the achievement indices are different between the operators of different shifts (6) Status 6: the operators do not follow the regulations to transfer accounts.

The present invention detects an abnormal point 62 being against the aforementioned statuses, and forms a calendar file 60 by sorting the apparatus events with time. Then, the present invention executes a step of replaying apparatuses events 64 for monitoring the aforementioned calendar file of graphic interface, and then proceeds a rectification 66 to recheck the abnormal point 62.

Figure 4:
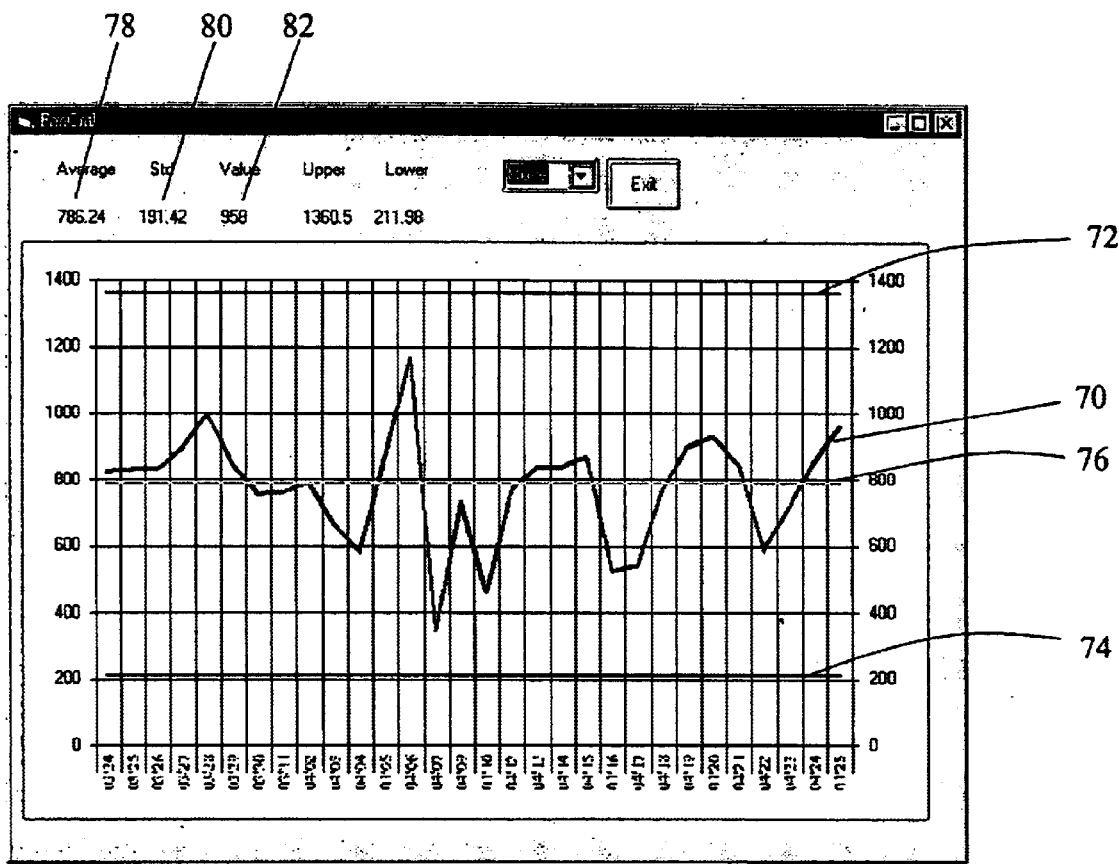
FIG. 4 illustrates the computer graphic interface system of control chart according to the method and system of monitoring apparatuses of manufacturing IC of the present invention.

Following is a preferred embodiment of the method and system of monitoring apparatuses of manufacturing IC of the present invention. Referring to FIG. 3 again, in the IC factory, the database 50 stores information of WIP periodically, such as apparatus events, production output of transferring account, and stock of WIP. Hence, the method of monitoring apparatuses of manufacturing IC of the present invention first inputs the time space t, and then the data of apparatus event 52 are downloaded from the database 50, wherein the data of apparatus event 52 include apparatus status, transferred out account, and data of WIP. Then, the present invention proceeds a mathematic operation to obtain an apparatus achievement indices 54 by using the data of apparatus event 52, wherein the apparatus achievement indices 54 include, production output (move), productive time (PT), pieces of hour (POH), time of waiting material (loss time; LT), batch counts (batch), averaged waiting time of waiting of WIP (W), and waiting length of WIP (L). Then, the present invention establishes a control chart 56 by using the apparatus achievement indices, and a computer graphic interface system with the control chart 56 such as shown in FIG. 4, wherein the actual line of trend of achievement index 70 is between the upper limit line 72 and the lower limit line 74, and the average actual line of trend of achievement index 70 is not deviated from the middle line 76 too much. On the top of the computer interface system, the average of achievement indices 78, standard deviation of achievement indices 80, and the current achievement indices 82 are shown. The control chart of the present invention is determined by gathering about 60 data in 2 months, and the upper limit line 72 and the lower limit line 74 are defined with 3 standard deviations. Since the method to establish the control chart is understood by a person skilled in this art, and is not a focal point of the present invention, the details will not be described herein. After downloading data of apparatus event 52 from the database 50 and calculating apparatus achievements indices, the present invention establishes a knowledge archive of rules 58 to determine a plurality of limitative rules to detect abnormal points 62 by using the computer. The method of monitoring apparatuses of manufacturing IC of the present invention determines the statuses against the limitative rules include:

(1) Status 1: A. The lots of WIP are more than 4 lots, and the pieces of WIP are more than 96 pieces. B. The status of apparatus event shows waiting for materials, but the waiting time is more than 10 minutes.

(2) Status 2: The achievement indices are over the upper limit line 72 or below the lower limit line 74 in the control chart as shown in FIG. 4. In the other words, the achievement indices are over the limit of 3 standard deviations.

(3) Status 3: In the control chart as shown in FIG. 4, there are 5 or more than 5 points of the achievements indices located at the same side of middle line 76 continuously.

(4) Status 4: A. Correlation coefficient R of 5 consecutive points of achievement indices is calculated by regression statistic. If value of R is equal to or over 0.85, or is less than −0.85, the achievement indices are considered having a trend. B. 5 consecutive points of achievement indices are either in increasing direction, or in decreasing direction.

(5) Status 5: In the method of monitoring apparatuses of manufacturing IC of the present invention, there are 4 operator shifts A, B, C, D, wherein the A & C are day shifts, and B & D are night shifts. In addition, A & B are the day and night shifts on the same day, and C & D are the day and night shifts on the day. (a) If achievement indices are apparently different between the first day and the second day shifted for the shifts A & B, the status against the limitative rules is established. (b) If achievement indices are apparently different between the first day and the second day for the shifts C & D, the status against the limitative rules is established. (c) If achievement indices are apparently different on the same day between the shifts of A & B and the shifts of C & D, the status against the limitative rules is established. In the aforementioned items (a), (b), and (c), 30 data are detected for checking the difference.

(6) Status 6: If the operators do not transfer accounts, or do process wafers over the predetermined time, the status against the limitative rules is established.

Figure 5:
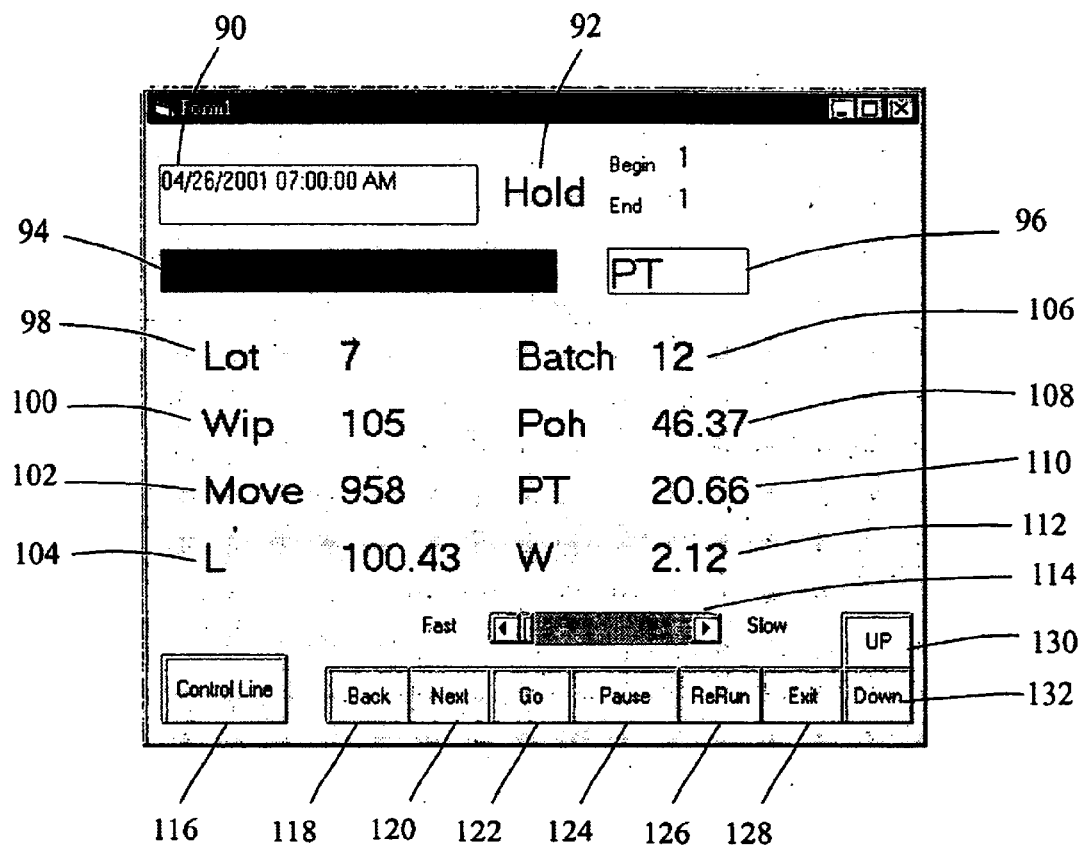
FIG. 5 illustrates the schematic diagram of the computer graphic interface system implementing apparatus replaying system of the method and system of manufacturing IC of the present invention.

Then, the present invention sorts the apparatus events with time, and establishes a calendar file 60 recording changes of apparatus status, transferred out accounts, processing WIP, waiting WIP, lots of wafer processed, achievement indices and abnormal points. The present invention reads the aforementioned calendar file to replay apparatus events 64 with computer interface system as shown in FIG. 5. The computer interface system displays the sorted results one by one in a window. Users can regulate, pause, continue, break off or replay the data in the window, and even can jump to another abnormal point and also be noticed by another message window. The computer interface system can further display with different colors according to the different events.

Figure 6:
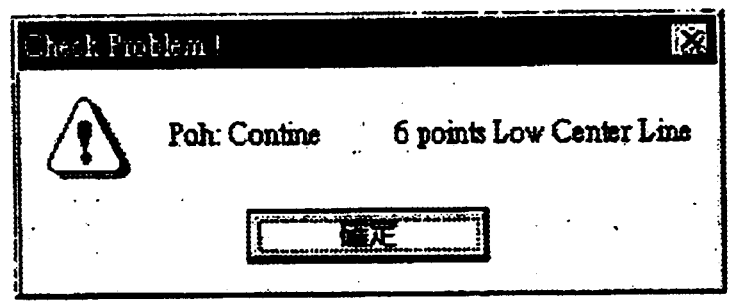
FIG. 6 illustrates the schematic diagram of message window when the apparatus replaying system of the present invention detects an abnormal point.
Figure 7:
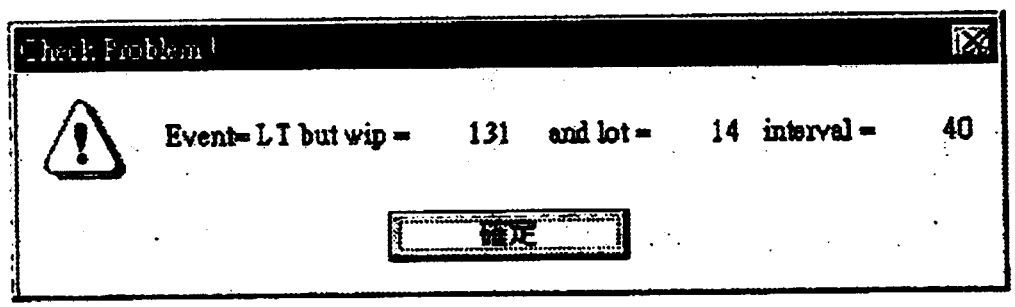
FIG. 7 illustrates the schematic diagram of message window when the apparatus replaying system of the present invention detects an abnormal point.

Referring to FIG. 5, the event playing time 90 is AM 7:00, Apr. 26, 2001. At the right side of the time of events is the hold state of wafer 92, and the apparatus event 94 and the description of apparatus events 96 are displayed below the event playing time 90 and the hold state of wafer 92. Besides, the window also display the information of wafer and apparatus, such as lots of wafers 98, pieces of wafer 100, production output (Move) 102, waiting length (L) of wafer 104, lots of wafer processed by apparatus 106, pieces of hour (POH) of apparatus 108, productive time (PT) 110, averaged waiting time of WIP (W) 112 and etc. When the limitative rules are violated so as to detect an abnormal point 62, the message windows are displayed automatically as shown in FIG. 6 and FIG. 7. FIG. 6 describes that 6 data are lower than the middle line so that the status (3) is met. FIG. 7 describes that there are wafers in apparatus but the apparatus status shows waiting for materials, so that the status (1) is met. If users need more detail information, they can enter the model of control chart 116 to look up events.

The computer interface system used by the replaying system of apparatuses of the present invention may further regulate the playing speed of the calendar file as shown in FIG. 3 by selecting speed adjustor 114, and read data by pressing the keys of Back 118, Next 120, Up 130, Down 132, Go 122, Pause 124, Rerun 126 and Exit 128.

It is noticed that the information in the preferred embodiment referring to FIG. 3, the apparatus events 52 downloaded, the apparatus achievement indices 54 calculated, and the data of apparatuses and wafers are read, calculated, displayed, and used from the calendar file are all merely stated for examples, the present invention can further adds or abate the data read and used. Besides, the parameters and statuses of establishing the control chart 56 and the knowledge archive of rules 58 are also merely stated for examples, and the present invention is not limited thereto.

The computer interface system of the replaying system of apparatuses of the present invention can be programmed by the language of visual basic or foxpro, but the present invention is not limited thereto. In addition, the parameter and data displayed in the computer interface system are stated for examples, and the present invention can further assist with a bar chart or animations according to the information in the calendar file and the control chart. The present invention can be expanded by the knowledge archive of rules, or by adding intelligent principles of fuzzy and neural network, to form an expert system of diagnosing problems of IC factory.

The method and system of monitoring apparatus of manufacturing IC of the present invention is established by reviewing the past achievements and by foreseeing the future problems, wherein reviewing the past achievements are aimed by establishing a model for replaying apparatus history and achievements, and foreseeing the future problems are aimed by establishing control charts and a knowledge archive of rules.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method of monitoring apparatuses of manufacturing integrated circuit (IC), while a plurality of lots of wafers are processed by a plurality of apparatuses, used for monitoring a plurality of apparatus events, the method of monitoring apparatuses of manufacturing IC comprising:

providing a database with a plurality of data of the apparatus events;

downloading the data of the apparatus events from the database;

calculating a plurality of achievement indices by using the data of the apparatus events;

establishing a control chart by using the achievement indices, wherein the achievement indices comprises a production output (move), a productive time (PT), a pieces of hour (POH), a time of waiting for material (loss time; LT), a batch count (batch), a averaged waiting time of WIP (W), and a waiting length of WIP (L);

establishing a knowledge archive of rules by using the data of the apparatus events, the achievement indices, and the control chart, and determining a plurality of limitative rules to detect an abnormal point;

forming a calendar file by sorting the data of the apparatus events with time; and executing a step of replaying the apparatus events so as to proceed a rectification.

2. The method of monitoring apparatuses of manufacturing IC of claim 1, wherein the data of the apparatus events comprises: an apparatus status, a plurality of transferred out accounts, and a plurality of data of work in process (WIP).

3. The method of monitoring apparatuses of manufacturing IC of claim 1, wherein the control chart is established by gathering about 60 data in 2 months of the data of the apparatus events, and restricted by 3 standard deviations.

4. The method of monitoring apparatuses of manufacturing IC of claim 1, wherein the calendar file comprises a plurality of changes of the apparatus statuses, transferred out accounts, and WIP.

5. The method of monitoring apparatuses of manufacturing IC of claim 1, wherein the step of replaying apparatus events further comprises establishing a apparatus replaying system by establishing a plurality of graphic interfaces with the calendar file and the knowledge archive of rules.

6. The method of monitoring apparatuses of manufacturing IC of claim 5, wherein the apparatus replaying system is programmed by the language which is selected from a group consisting of visual basic and foxpro.

7. A method of monitoring apparatuses of manufacturing integrated circuit (IC), while a plurality of lots of wafers are processed by a plurality of apparatuses, used for monitoring a plurality of apparatus events, the method of monitoring apparatuses of manufacturing IC comprising:

providing a database with a plurality of data of the apparatus events;

downloading the data of the apparatus events from the database;

calculating a plurality of achievement indices by using the data of the apparatus events, wherein the achievement indices comprises a production output (move), a productive time (PT), a pieces of hour (POH), a time of waiting for material (loss time; LT), a batch count (batch), an averaged waiting time of WIP (W), and a waiting length of WIP (L);

establishing a control chart by using the achievement indices;

establishing a knowledge archive of rules by using the data of the apparatus events, the achievement indices, and the control chart;

forming a calendar file by sorting the data of apparatus events with time; and executing a step of replaying apparatus events by a apparatus replaying system so as to read the apparatus events.

8. The method of monitoring apparatuses of manufacturing IC of claim 7, wherein the data of the apparatus events comprises: an apparatus state, a plurality of transferred out account, and a plurality of data of work in process.

9. The method of monitoring apparatuses of manufacturing IC of claim 7, wherein the control chart is established by gathering about 60 data in 2 months of the data of the apparatus events, and restricted by 3 standard deviations.

10. The method of monitoring apparatuses of manufacturing IC of claim 7, wherein the calendar files comprises a plurality changes of apparatus statuses, transferred out accounts, and WIP.

11. The method of monitoring apparatuses of manufacturing IC of claim 7, wherein the step of establishing the knowledge archive with rules further comprises determining a plurality of limitative rules to detect an abnormal point.

12. The method of monitoring apparatuses of manufacturing IC of claim 7, wherein the step of replaying apparatus events by an apparatus replaying system further comprises establishing a plurality of graphic interfaces with the calendar file and the knowledge archive of rules.

13. The method of monitoring apparatuses of manufacturing IC of claim 7, wherein the replaying system of apparatuses is programmed by the language which is selected from a group consisting of visual basic and foxpro.

14. A system of monitoring apparatuses of manufacturing IC, to monitor a plurality of the apparatus events, wherein a plurality of apparatuses process a plurality of lots of wafers with a plurality of steps, the system of monitoring apparatuses of manufacturing IC comprising:

a control mainframe for controlling the apparatuses;

a data mainframe with a plurality of operation parameters for recording a plurality of data of the apparatus events and a plurality of process data; and a control mainframe for executing a process of monitoring the apparatuses by replaying the apparatus events processing the lots of wafers, the process of monitoring apparatuses comprising:

downloading the data of the apparatus events from the data mainframe;

calculating a plurality of achievement indices by using the data of the apparatus events, wherein the achievement indices comprises a production output (move), a productive time (PT), a pieces of hour (POH), a time of waiting for material (loss time; LT), a batch count (batch), an averaged waiting time of WIP (W), and a waiting length of WIP (L);

establishing a control chart by using the achievement indices;

establishing a knowledge archive of rules by using the data of the apparatus events, the achievement indices, and the control chart, and determining a plurality of limitative rules to detect an abnormal point;

forming a calendar file by sorting the data of apparatus events with time; and executing a step of replaying apparatus events so as to proceed a rectification.

15. The system of monitoring apparatuses of manufacturing IC of claim 14, wherein the control chart is established by gathering about 60 data in 2 months of the data of apparatus events, and restricted by 3 standard deviations.

16. The system of monitoring apparatuses of manufacturing IC of claim 14, wherein the calendar files comprises a plurality changes of apparatus statuses, transferred out accounts, and WIP.

17. The system of monitoring apparatuses of manufacturing IC of claim 14, wherein the step of replaying the apparatus events further comprises establishing a apparatus replaying system by establishing a plurality of graphic interfaces with the calendar file and the knowledge archive of rules.

18. The system of monitoring apparatuses of manufacturing IC of claim 17, wherein the apparatus replaying system is programmed by the language which is selected from a group consisting of visual basic and foxpro.

* * * * *